(12) United States Patent
Harayama et al.

(10) Patent No.: US 9,025,115 B2
(45) Date of Patent: ***May 5, 2015

(54) LIQUID CRYSTAL DISPLAY DEVICE

(75) Inventors: Takeshi Harayama, Mobara (JP);
Takashi Yoshimoto, Mobara (JP);
Katsuhiko Ishii, Chosei (JP); Setsuo Kobayashi, Mobara (JP); Akira Ishii, Mobara (JP); Shinji Tanabe, Mobara (JP); Kiyoshi Sento, Sakura (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/361,086

(22) Filed: Jan. 30, 2012

(65) Prior Publication Data

US 2012/0200805 A1 Aug. 9, 2012

(30) Foreign Application Priority Data

Feb. 9, 2011 (JP) ................... 2011-026329

(51) Int. Cl.
*G02F 1/1333* (2006.01)
*G02F 1/1335* (2006.01)

(52) U.S. Cl.
CPC ........... *G02F 1/133512* (2013.01); *G02F 2001/133331* (2013.01); *G02F 2201/08* (2013.01)

(58) Field of Classification Search
CPC ............. G02F 1/133512; G02F 1/133528; G02F 2202/28
USPC .............. 349/12, 58, 62, 96, 110, 56, 61, 84, 349/122, 111, 162
See application file for complete search history.

(56) References Cited

U.S. PATENT DOCUMENTS 6,954,243 B2 * 10/2005 Ota et al. .................. 349/110
7,626,674 B2 * 12/2009 Koyama et al. ............ 349/153
(Continued)

FOREIGN PATENT DOCUMENTS

JP 2003-5160 A 1/2003
JP 2003005160 1/2003
(Continued)

OTHER PUBLICATIONS

Davison, Angela K., Office Action, Notification Date of Apr. 24, 2013; U.S. Appl. No. 13/364,358; Titled: Liquid Crystal Display Device; filed Feb. 2, 2012; Inventors: Takeshi Harayama et al.; 23 pages; in its entirety.

(Continued)

*Primary Examiner* — Richard Kim
*Assistant Examiner* — Angela Davison
(74) *Attorney, Agent, or Firm* — Ulmer & Berne LLP

(57) ABSTRACT

Light emitted by a backlight can be prevented from leaking through a chamfered portion of a front window of a liquid crystal display device.

An upper polarizing plate is bonded over the counter substrate, and a front window is bonded over the upper polarizing plate with a UV-curable resin adhesive. The front window is chamfered and a light shielding member is formed on the chamfered portion. The UV adhesive exists between the chamfered portion and the surface of the upper polarizing plate or the counter substrate, and an outer end of the polarizing plate exists at a point outer than an outer end of the front window. Since the light shielding member for the chamfered portion is formed, light from the backlight does not penetrate from the chamfered portion. Thus, light leakage at a periphery of a screen can be prevented even when the view angle is large.

5 Claims, 6 Drawing Sheets

(56) References Cited

U.S. PATENT DOCUMENTS

| | | |
|---|---|---|
| 7,764,333 B2 | 7/2010 | Kim |
| 8,284,344 B2 | 10/2012 | Harada |
| 2002/0191131 A1 | 12/2002 | Ota et al. |
| 2003/0081151 A1 | 5/2003 | Tsuchihashi et al. |
| 2005/0151899 A1 | 7/2005 | Chou et al. |
| 2007/0222912 A1* | 9/2007 | Sato et al. .............. 349/58 |
| 2008/0153377 A1 | 6/2008 | Kobayashi et al. |
| 2009/0002607 A1* | 1/2009 | Kubota et al. ........... 349/96 |
| 2009/0086114 A1* | 4/2009 | Higuchi et al. .......... 349/12 |
| 2009/0296033 A1 | 12/2009 | Shinya et al. |
| 2010/0165603 A1 | 7/2010 | Sun et al. |
| 2010/0231821 A1* | 9/2010 | Tsuji et al. ............. 349/58 |
| 2010/0245707 A1 | 9/2010 | Harada |
| 2010/0296027 A1* | 11/2010 | Matsuhira et al. ........ 349/96 |
| 2011/0102717 A1 | 5/2011 | Kubota et al. |
| 2012/0200796 A1 | 8/2012 | Harayama et al. |

FOREIGN PATENT DOCUMENTS

| | | |
|---|---|---|
| JP | 2009-8973 A | 1/2009 |
| JP | 2009-192792 A | 8/2009 |
| JP | 2010-231021 A | 10/2010 |
| TW | 201024866 | 7/2010 |
| WO | 2009/011366 A1 | 1/2009 |

OTHER PUBLICATIONS

Final Office Action issued in counterpart Japanese Patent Application Serial No. 2011-026329; dated Jul. 15, 2014; in its entirety, English language portion only.

Davison, Angela K.; Non-Final Office Action issued in co-pending U.S. Appl. No. 13/364,358; dated as mailed on Mar. 20, 2014; Title: Liquid Crystal Display Device; filed Feb. 2, 2012; Inventors: Takeshi Harayama et al.; 14 pages.

Davison, Angela K.; Final Office Action issued in co-pending U.S. Appl. No. 13/364,358; dated as mailed on Aug. 27, 2013; Title: Liquid Crystal Display Device; filed Feb. 2, 2012; Inventors: Takeshi Harayama et al.; 31 pages.

* cited by examiner

LIQUID CRYSTAL DISPLAY DEVICE

CLAIM OF PRIORITY

The present application claims priority from Japanese Patent Application JP 2011-026329 filed on Feb. 9, 2011, the content of which is hereby incorporated by reference, into this application.

BACKGROUND OF THE INVENTION

1. Field of the Invention

The present invention relates to liquid crystal display devices, and more particularly relates to a technique for improving strength and visibility of small-sized display devices used for digital steel cameras and mobile phones.

2. Description of the Related Art

A liquid crystal display panel includes a TFT substrate, a counter electrode opposing the TFT substrate, and liquid crystals put between the TFT substrate and the counter substrate. The TFT substrate has thin film transistors (TFT), etc. formed thereon in a matrix form. The counter electrode has color filters, etc. formed at positions corresponding to the pixel electrodes of the TFT substrate. The liquid crystal display device forms images by controlling light transmittance of each pixel using liquid crystal molecules.

An upper polarizing plate is bonded over the counter substrate. The upper polarizing plate is formed of resin so it is easily damaged. A front window formed of glass is often disposed over the upper polarizing plate as a countermeasure. Since the front window is used for mechanically protecting the liquid crystal display panel, as show in FIG. 8, the front window is provided such that the front window and the liquid crystal display panel is spaced apart from each other.

The conventional art as shown in FIG. 8 involves a problem that a double image is observed. FIG. 8 shows a reflection type liquid crystal display panel as an example so that the problem is understood easily. In FIG. 8, after an external light L enters and transmits a front window 30, the light L is reflected at a liquid crystal display panel comprising a TFT substrate 10 and a counter substrate 20, transmits the front window 30 again, and then enters one's eyes. Incidentally, although the external light L is refracted in the front window 30, the refraction is not illustrated in FIG. 8.

A portion of the light reflected at the screen P1 of the liquid crystal display panel is reflected at the lower surface Q1 of the front window. The light travels towards the screen P2 of the liquid crystal panel and is reflected thereat. When a person visually recognizes the light reflected at P2, a phenomenon such that images are seen double occurs.

While a reflection type liquid crystal display panel was shown in FIG. 8 as an example, this also holds true for a transmission type panel. That is, in a transmission type, panel, when light transmits through the liquid crystal display panel at an angle identical with that of the light reflected at P1 in the liquid crystal display panel, the light reflects on the front window lower surface Q1 and follows the same path as described in the reflection type panel. The double image phenomenon deteriorates image quality.

On the other hand, the liquid crystal display panel involves a problem that light reflected at an end face of the TFT substrate 10 and the counter substrate 20 is emitted from the display area, thereby lowering contrast of the screen. As to solve the problem, JP-A No. 2003-5160 discloses a configuration in which an end face of the TFT substrate and the counter substrate is adapted to have a light shielding surface to prevent light reflection from the end face. However, JP-A No. 2003-5160 has no disclosure related to front windows, and no description is made for light leakage at a periphery of an image screen equipped with a front window.

SUMMARY OF THE INVENTION

The problem described with reference to FIG. 8 can be solved by bonding the front window 30 and the counter substrate 20 with an adhesive having a refractive index approximate to that of glass. FIG. 7 is a cross sectional view showing a liquid crystal display panel of such a configuration.

In FIG. 7, a liquid crystal layer (not illustrated) is put between a TFT substrate 10 and a counter substrate 20, and the liquid crystals are sealed at the periphery by a seal member. A black matrix 22 is formed on the counter substrate 20. The black matrix 22 is not formed at a portion where a frame-like seal member is disposed to prevent peeling of the seal member.

Light emitted from a backlight may leak out to the frontal surface at a portion where the black matrix is not formed. An upper polarizing plate 21 is bonded to the counter substrate 20. A lower polarizing plate (not illustrated in FIG. 7) is bonded to the TFT substrate 10. A backlight 100 is disposed below the TFT substrate 10. The liquid crystal display panel comprised of the TFT substrate 10 and the counter substrate 20 is disposed in a mold 110, and the mold 110, the liquid crystal display panel, the backlight 100, etc. are enclosed in a lower frame 120 formed of metal.

The upper polarizing plate 21 and the front window 30 are bonded with an adhesive 40 comprising a UV-ray (UV) curable resin. A light shielding printing 32 is formed along the periphery of the front window 30 lower surface to shield light entering from the periphery. The end of the front window 30 is processed to have a chamfered portion 31.

A frame-like light shielding tape 60 is bonded to the upper portion of the counter substrate 20 and the mold 110 to shut out light incident to the front window 30 from an area outside the upper polarizing plate 21. The end of the frame-like light shielding tape 60 is disposed flush with the upper polarizing plate 21 or above the upper polarizing plate 21. In such a configuration, the end of the frame-like light shielding tape 60 tends to peel off as shown in FIG. 7.

If the shielding tape 60 peels off, only the adhesive 40 is present between the upper surface of the counter substrate 20 and the chamfered portion of the front window 30. In order to prevent boundary reflection at the front window 30 and improve screen brightness, a substance having a refractive index approximate to that of glass is used for the adhesive 40.

When only such adhesive 40 is present between the upper surface of the counter substrate 20 and the chamfered portion 31 of the front window 30, light directly penetrates into the front window 30 and is visually recognized as light leakage, thereby lowering contrast at the periphery of the screen. Further, light that transmitted the adhesive 40 under the frame-like light shielding tape 60 as the arrow shown in FIG. 7 is more easily recognized as the view angle becomes larger.

The light emitting from the periphery of the screen caused no problem when the view angle θ1 shown in FIG. 9 was about 60 degrees as in the conventional cases. However, it is recently demanded, particularly, in digital still cameras (DSC) to have a view angle θ2 of about 180 degrees. In such a case, light incident to the periphery of the front window 30 (shown by the arrow) in FIG. 7 causes a problem. Although the polarizing plate 21 is provided below the chamfered portion 31, it is difficult to shield the leaked light only by the polarizing plate 21.

That is, in a configuration as shown in FIG. 7 in which the front window 30 and the liquid crystal panel are bonded with the adhesive 40, the light entering from the chamfered portion 31 of the front window causes a problem.

The present invention intends to, in a configuration in which the front window 30 is bonded to the liquid crystal display panel with the adhesive 40, prevent light from the backlight 100 or an external light from entering the periphery of the front window 30 so that the contrast at the periphery of the screen will not be deteriorated even when the view angle is large.

The present invention intends to overcome the problem described above and typical means for solving the problem is as described below.

That is, one aspect of the present invention is a liquid crystal display device having a liquid crystal panel, comprising: a TFT substrate on which pixel electrodes and TFTs for controlling signals for the pixel electrodes are arranged in a matrix; a counter substrate on which color filters corresponding to the pixel electrodes are formed; and a backlight disposed at the back side of the liquid crystal display panel; wherein: an upper polarizing plate and a light shielding member are disposed over the counter substrate, the light shielding member being disposed at a portion outside the upper polarizing plate; a front window is bonded onto the polarizing plate with a UV-ray curable resin; and the UV-ray curable resin is disposed over the upper polarizing plate and the light shielding member, and a light shielding tape is disposed over the UV-ray curable resin.

Another aspect of the present invention is a liquid crystal display device having a liquid crystal panel comprising: a TFT substrate on which pixel electrodes and TFTs for controlling signals for the pixel electrodes are arranged in a matrix; a counter substrate on which color filters corresponding to the pixel electrodes are formed; and a backlight disposed at the back side of the liquid crystal display panel; wherein an upper polarizing plate is bonded to the counter substrate; a front window is bonded onto the upper polarizing plate with an UV-curable resin; the front window is chamfered; and a light shielding member is formed at the chamfered portion of the front window.

According to the present invention, in a liquid crystal display device having a front window, light emitted by a backlight intruding from a chamfered portion of the front window can be shielded. Light leakage at the periphery of the screen can be prevented when the screen is observed obliquely. Thus, a liquid crystal display device that has an excellent contrast even when the screen is viewed from an oblique direction can be achieved.

DESCRIPTION OF THE ACCOMPANYING DRAWINGS

DESCRIPTION OF THE PREFERRED EMBODIMENTS

The present invention is to be disclosed specifically in accordance with preferred embodiments.

Embodiment 1

Figure 1:
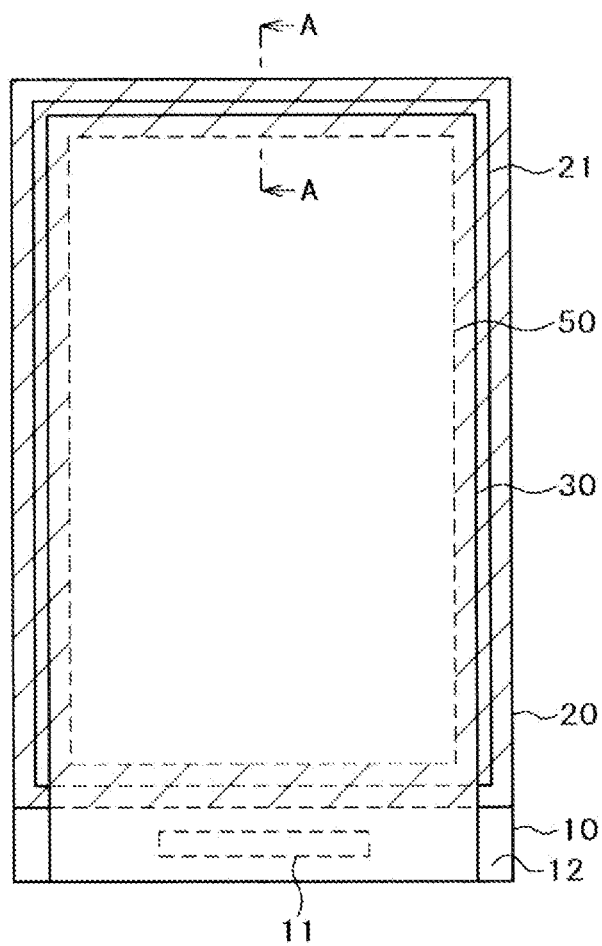
FIG. 1 is a plan view of a liquid crystal display device of Embodiment 1.
Figure 2:
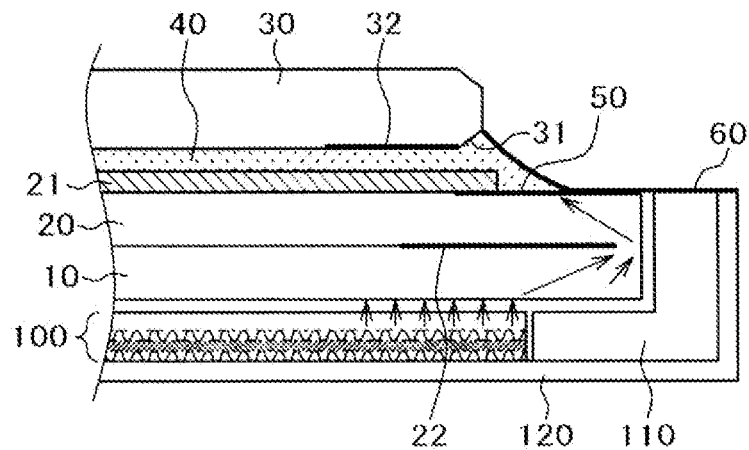
FIG. 2 is a cross sectional view taken along line A-A in FIG. 1.

FIG. 1 is a plan view showing a first embodiment of the present invention and FIG. 2 is a cross sectional view taken along line A-A in FIG. 1 including a mold and a lower frame. In FIG. 1, a liquid crystal display panel comprises a TFT substrate 10 and a counter substrate 20. A lower polarizing plate (not illustrated) is bonded to the TFT substrate 10, and an upper substrate 21 is bonded over the counter substrate 20. A backlight 100 is disposed below the TFT substrate 10. The TFT substrate 10 is larger than the counter substrate 20, and a portion where the TFT substrate 10 is larger is a terminal portion 12 on which an IC driver 11, etc. are disposed.

Figure 7:
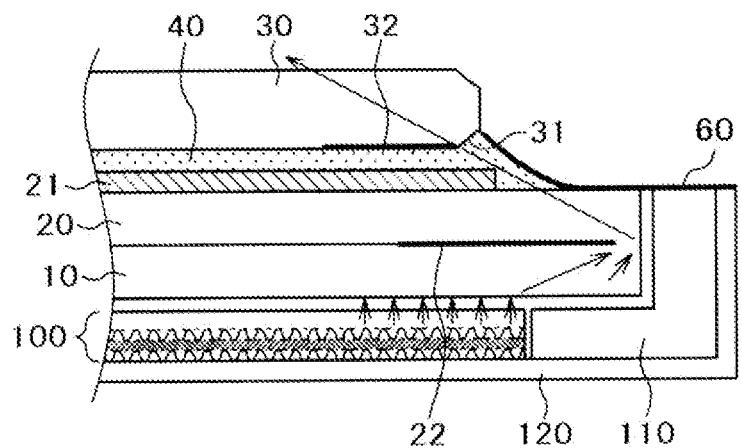
FIG. 7 is a cross sectional view showing an conventional example of a liquid crystal display device having a front window.
Figure 8:
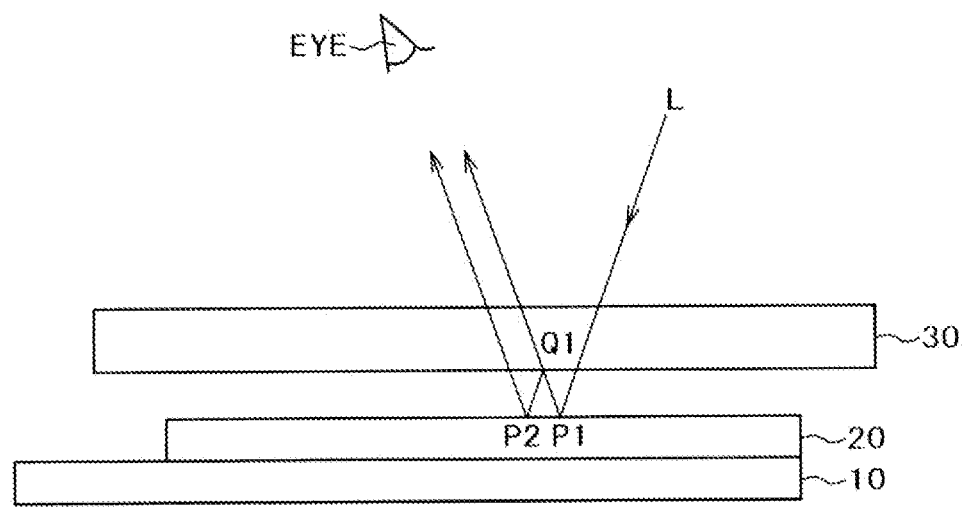
FIG. 8 is a cross sectional view showing a problem in another existent example of a liquid crystal display device having a front window.
Figure 9:
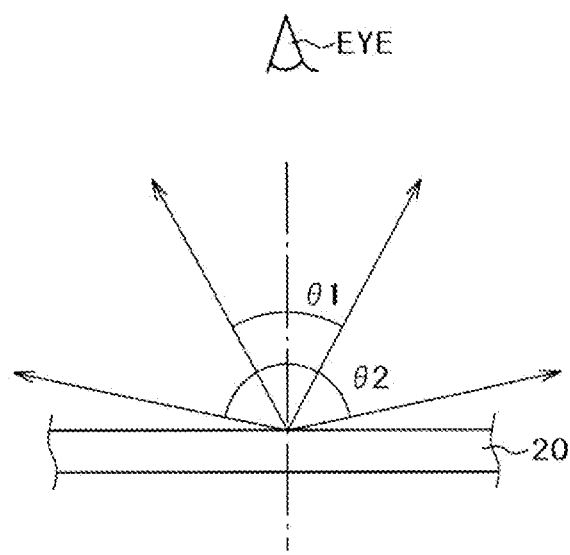
FIG. 9 is a schematic view for defining a view angle.

A front window 30 formed of glass is bonded over the liquid crystal panel and the upper polarizing plate 21. In FIG. 1, three of the sides of the liquid crystal display panel except the side for the terminal portion 12 have an outer shape smaller than that of the liquid crystal display panel. Further, three of the sides of the upper polarizing 21 except the side for the terminal portion 12 also have an outer shape larger than that of the front window 30. As described with FIG. 7, a portion between the lower surface and the side wall surface of the front window 30 is processed to have a chamfered portion 31. Light emitted by the backlight 100 enters from the chamfered portion 31.

The backlight 100 emits light from the back side of the liquid crystal panel to the front side thereof, and its light source is disposed at the side of a first side (side of the rectangle). The first side is the side on which the IC driver is disposed and having the terminal portion 12. The light source emits light to a side face of a light guiding plate so that the light is delivered from the first side towards a second side opposing the first side. Therefore, the phenomenon is particularly remarkable at the short side of the front window 30 that is opposite to the terminal portion 12.

In this embodiment, light as shown with the arrows are from the backlight 100 are prevented from being emitted to the upper surface of the counter substrate 20 by bonding the light shielding member 50 (substrate light shielding member) at the periphery of the counter substrate 20 upper surface.

The major difference between this embodiment and the conventional example is that the substrate light shielding member 50 is bonded under the polarizing plate 21 and a frame-like light shielding tape 60 is bonded over a UV-ray curable resin. The frame-like shielding tape 60 is disposed at a portion of the front window 30 where the front window 30 projects outward from the liquid crystal panel bonded thereupon. In FIG. 1, the frame-like light shielding tape 60 is omitted and not illustrated.

Figure 3:
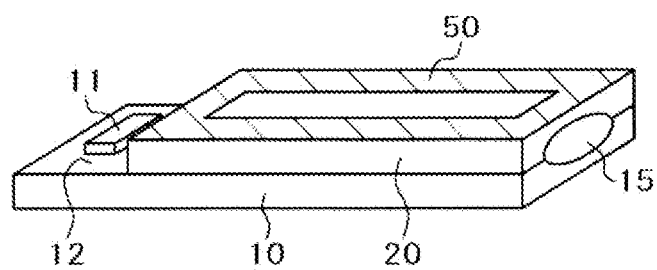
FIG. 3 is a perspective view showing the liquid crystal display device of Embodiment 1 in the course of assembling.

FIG. 3 is a perspective view of the liquid crystal display panel before the upper polarizing plate 21 is bonded. In FIG. 3, the counter substrate 20 is disposed on the TFT substrate 10. Liquid crystals (not shown) are enclosed between the TFT substrate 10 and the counter substrate 20 and sealed at a seal portion 15. The IC driver 11 is disposed at the terminal portion 12 of the TFT substrate 10.

In FIG. 3, a light shielding tape 50 is bonded in a frame-like from at the periphery of the counter substrate 20. The substrate light shielding member 50 is to be provided at least at the side opposing the side where the light source is installed. Then, as shown in FIG. 2, the polarizing plate 21 is mounted. At this time, the light shielding member and the upper polarizing plate are disposed to partially overlap with each other. Then, a UV curable resin 40 is coated over the polarizing plate 21 and the front window 30 is bonded. The adhesive 40 is initially a liquid. Therefore, when the front window 30 and the polarizing plate are to be bonded to each other, the adhesive spreads and exceeds the edge of the front window. The adhesive 40 also sticks to the chamfered portion 31 formed at the end of the front window.

Next, at the outside of the front window 30, the frame-like light shielding tape 60 is disposed over the adhesive 40. With this configuration, light from the backlight reflected at a mold 110 can also be shielded.

Referring again to FIG. 2, the substrate light shielding member 50 is bonded with a pressure sensitive adhesive to the counter substrate 20. The inner end of the substrate light shielding member 50 exists more inwardly than the chamfered portion 31 of the front window 30 (at the side of the image display area).

Thus, intrusion of light emitted by the backlight 100 into the chamfered portion 31 of the front window 30 is prevented. Since the substrate light shielding member 50 is bonded on the flat upper surface of the counter substrate 20, it is unlikely to peel off. In addition, since the upper polarizing plate 21 extends to the outside of the front window 30, even if an end of the upper polarizing plate 21 is peeled, the light from the backlight 100 is shielded by the substrate light shielding member 50 and would not enter the chamfered portion 31 of the front window 30.

That is, as shown in FIG. 2, a portion of the light from the backlight 100 passes through an area of the periphery of the counter substrate 20 where the black matrix is not formed. The light enters a lateral side of the TFT substrate 10 and the counter substrate 20, reflects thereon, and travels towards the upper surface of the counter substrate 20.

Although not illustrated in FIG. 2, a seal member for bonding the TFT substrate 10 and the counter substrate 20 is formed near the inner end face of the TFT substrate 10 and the counter substrate 20. The seal member is generally transparent so the light from the backlight 100 is reflected on the lateral side of the TFT substrate 10 or the counter substrate 20 and travels towards the upper surface of the counter substrate 20 as shown in FIG. 2. However, the light is shielded by the substrate light shielding member 50 provided on the end of the counter substrate 20 upper surface, thereby preventing the light from entering the chamfered portion 31 of the front window 30.

Further, in an actual product, an upper frame (not shown in FIG. 2) is disposed along the outside of the front window 30 so external light from the lateral side of the front window 30 will be extremely little. Even when the external light enters from the lateral side, the light entering from the lateral side is totally reflected inside the front window 30 and exits from the opposite lateral side. Thus, light entering from the lateral side does not exit from the front surface of the front window and does not hinder image recognition.

Embodiment 1 is configured such that the substrate light shielding member 50 is disposed at the periphery of the counter electrode 20 and is unlikely to peel. Therefore, even when the adhesive 40 sticks to the chamfered portion 31 of the front window 30, the light from the backlight 100 does not enter the front window 30, thereby preventing light leakage at the periphery of the screen. Further, according to this embodiment, even when the black matrix 22 is not formed at a portion where the frame-like seal member is disposed to prevent seal peeling, the light from the backlight can be prevented from leaking out to the front surface.

Embodiment 2

Figure 4:
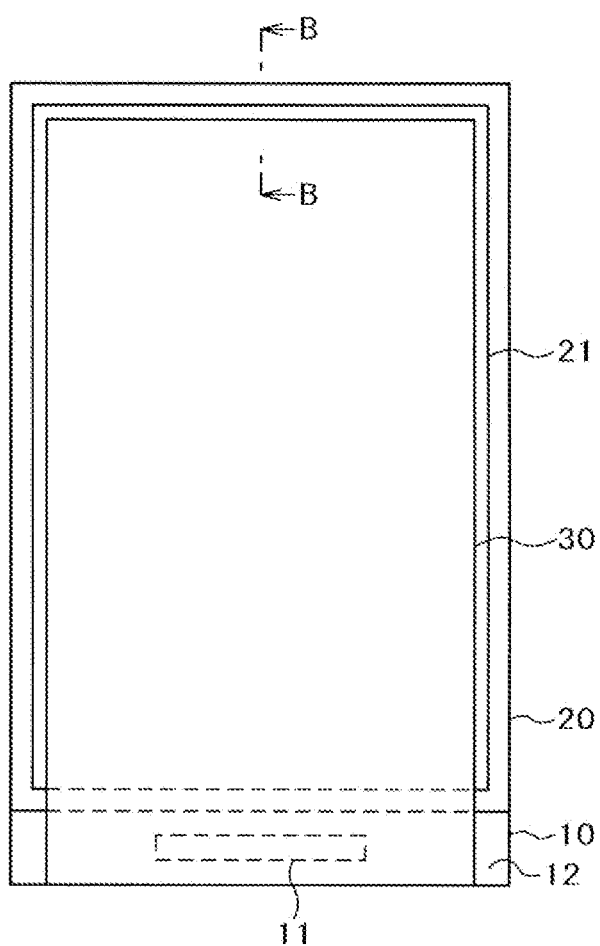
FIG. 4 is a plan view of the liquid crystal display device of Embodiment 1.

FIG. 4 is a plan view showing a second embodiment of the present invention. In FIG. 4, a liquid crystal display panel comprises a TFT substrate 10 and a counter substrate 20. An upper polarizing plate 21 is bonded by a pressure sensitive adhesive over the counter substrate 20, and a lower polarizing plate (not illustrated) is bonded to the backlight side surface of the TFT substrate 10. The TFT substrate 10 is formed larger than the counter substrate 20. The larger portion (the protruding portion) of the TFT substrate 10 is a terminal portion 12 on which an IC driver 11, etc. are disposed.

A front window 30 formed of glass is bonded over the liquid crystal display panel and the upper polarizing plate 21. In FIG. 4, the three sides of the front window 30 except the side of the terminal portion 12 have a smaller outer shape (are longer) than those of the liquid crystal display panel. In addition, the three sides of the upper polarizing plate 21 except the side of the terminal portion 12 have an outer shape larger than those of the front window 30.

Figure 5:
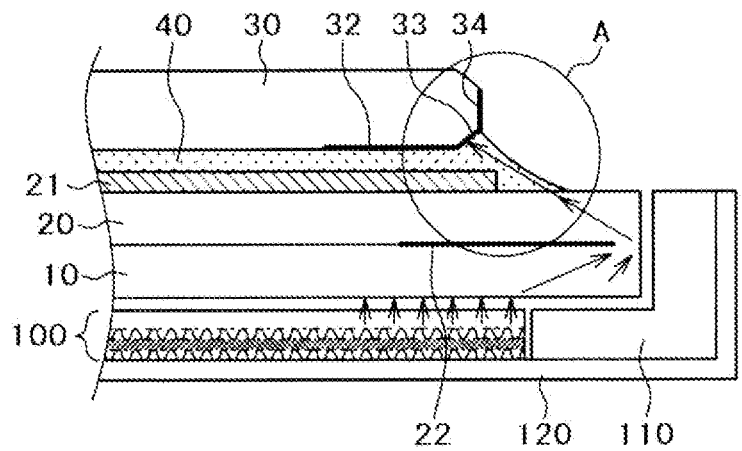
FIG. 5 is a cross sectional view taken along line B-B in FIG. 2.

FIG. 5 is a cross sectional view taken along line B-B in FIG. 4 including a mold 110 and a lower frame 120. The configuration of the liquid crystal display panel and other portions shown in FIG. 5 is similar to that shown in FIG. 2 in the Embodiment 1. The difference from the configuration FIG. 2 is that a light shielding tape is not formed along the periphery of the counter substrate 20.

In FIG. 5, a front window 30 is bonded over the upper polarizing plate 20 with an adhesive 40 of a UV-curable resin. The UV-curable resin 40 may be one that is initially a liquid containing an acrylic oligomer. A light shielding printing 32, a chamfered portion light shielding member 33, and a lateral side light shielding member 34 are respectively formed along the periphery of the lower surface of the front window 30, along the chamfered portion 31, and along the lateral side of the front window.

Bonding the front window 30 using the adhesive 40 in the liquid crystal display panel has an advantage that the liquid crystal display panel and the front window 30 can be positioned with correction because the adhesive 40 is initially a liquid. A UV-light is radiated to cure the resin after setting their position accurately so that they can be assembled accurately. In addition, UV-curable resin adhesive 40 is less expensive than a pressure sensitive adhesive.

Incidentally, a pressure sensitive adhesive is a bonding agent that becomes adhesive by an application of pressure. An adhesive is a bonding agent which is initially a liquid and becomes adhesive by being cured by heating or UV irradiation. Since the UV adhesive has fluidity before curing, the UV adhesive extends to the periphery of the upper polarizing plate.

In the configuration shown in FIG. 5, light emitted from the backlight 100 is reflected on the lateral side of the TFT substrate 10 or the counter substrate 20, and enters the front window 30 by way of the adhesive 40 on the counter substrate 20 or the upper polarizing plate 21. Among such light, the light entering from the chamfered portion 31 of the front window 30 is particularly important for the light leakage at the periphery of the screen.

That is, the adhesive 40 having a refractive index approximate to that of glass is used so that the light from the backlight 100 is not reflected at the boundary of the front window 30. Since the refractive index of the adhesive 40 disposed at the chamfered portion 31 of the front window 30 is also close to that of the front window 30, light traveling towards the chamfered portion of the front window 30 directly enters the chamfered portion 31.

However, since the light shielding member 33 is formed at the chamfered portion 31, the light from the backlight 100 does not intrude, to the inside of the front window 30. Accordingly, even when the view angle against the screen is increased, light leakage does not occur at the periphery of the screen. On the other hand, the light shielding printing 32 is formed at the periphery of the lower surface of the front window 30, and a lateral side light shielding member 34 is formed on the lateral side of the front window 30. Thus, the light from the backlight, etc. does not intrude from this portion.

Figure 6:
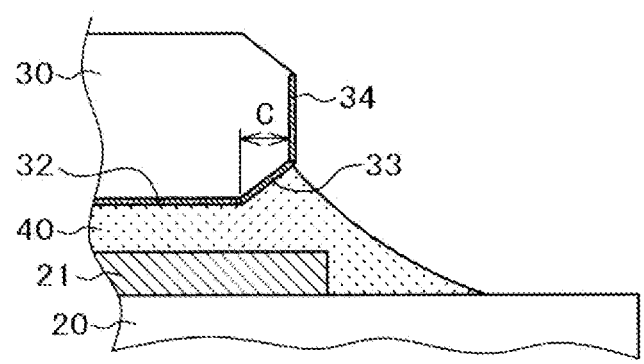
FIG. 6 is an enlarged view of a portion A in FIG. 5.

FIG. 6 is an enlarged view of a portion "A" in FIG. 5. An upper light polarizing plate 21 is bonded over the counter substrate 20, on which the front window 30 is bonded. The adhesive 40 of a UV curable resin is initially a liquid comprising an acrylic oligomer. The liquid adhesive covers the chamfered portion 31 of the front window due to the capillary phenomenon.

This allows the light that leaked from the backlight 100 to intrude the front window 30 and causes light leakage at the periphery of the screen. To avoid this, a light shielding member 33 is formed for the portion to prevent the light from the backlight 100 from intruding to the inside of the front window 30.

Various methods can be used for forming the light shielding member 50 to the chamfered portion 31 of the front window 30. For example, there is a method of coating a black ink by using a pen-like or brush-like tool. Further, a method of printing an ink containing a black pigment such as graphite by an offset method can be adopted. Since the chamfered portion shielding member can be formed on the front window in a state where the front window could be treated as an individual component, various methods can be adopted.

The light shielding tape 60 described in Embodiment 1 may be bonded over the adhesive 40. However, in this embodiment, since the chamfered portion light shielding member 33 is formed on the chamfered portion 31 and the lateral side light shielding member 34 is formed on the lateral side of the front window 30, light can be shielded sufficiently without bonding the light shielding tape 60. As a result, the light shielding tape 60 and the step of bonding the light shielding tape 60 can be saved.

According to this embodiment, the number of parts can be reduced and its assembling process can be simplified in addition to the advantageous effect of the Embodiment 1.

According to the invention, since the light intruding from the chamfered portion of the front window can be shielded, light leakage at the periphery can be prevented when the screen is viewed obliquely. Therefore, a display device having an excellent contrast when the screen is viewed in an oblique direction can be obtained.

What is claimed is:

1. A liquid crystal display device having a liquid crystal panel, comprising:
   a TFT substrate on which pixel electrodes and TFTs for controlling signals for the pixel electrodes are arranged in a matrix;
   a counter substrate on which color filters corresponding to the pixel electrodes and a black matrix are formed on an opposing side to the TFT substrate; and
   a backlight disposed at the back side of the liquid crystal display panel; wherein
   an upper polarizing plate and a light shielding member are in direct contact with the counter substrate, the light shielding member being disposed at a portion outside the upper polarizing plate;
   a front window is bonded onto the upper polarizing plate with a UV-ray curable resin;
   the UV-ray curable resin is disposed over the upper polarizing plate and the light shielding member, and a light shielding tape is disposed over the UV-ray curable resin;
   in plan view, the UV-curable resin completely covers the upper polarizing plate;
   in plan view, the UV-curable resin exists between the front window and the upper polarizing plate, and surrounds an outer edge of the front window;
   in plan view, the light shielding member is formed under a periphery of the upper polarizing plate, the light shielding member surrounds an outer edge of the upper polarizing plate, and the light shielding member surrounds the outer edge of the front window; and
   in plan view, the light shielding tape overlays on the UV-curable resin, and, in plan view, the light shielding tape surrounds the outer edge of the front window.

2. A liquid crystal display device according to claim 1, wherein an outer end of the polarizing plate exists more outwardly than an outer end of the front window.

3. A liquid crystal display device according to claim 1, wherein an inner end of the light shielding member exists more inwardly than a chamfered portion of the front window.

4. A liquid crystal display device according to claim 1, wherein the light shielding member and the upper polarizing plate partially overlaps with each other.

5. A liquid crystal display device according to claim 1, wherein,
   in plan view, the front window has a first side, a second side, a third side and a fourth side;
   the light shielding member is formed to surround the first side, the second side and the third side of the front window;
   the light shielding tape overlays on the UV-curable resin to surround the first side, the second side and the third side of the front window;
   the light shielding tape overlaps with the light shielding member surrounding the first side, the second side and the third side of the front window; and
   in plan view, the front window overlaps the counter substrate, and the sides of the counter substrate surrounds the first side, the second side and the third side of the front window.

* * * * *